United States Patent [19]

Füglein

[11] 4,252,596
[45] Feb. 24, 1981

[54] METHOD AND ARRANGEMENT FOR THE PRODUCTION OF THICK LAYERS OF CONTACT ADHESIVE

[75] Inventor: Egon Füglein, Aachen, Fed. Rep. of Germany

[73] Assignee: Sachs-Systemtechnik GmbH, Schweinfurt, Fed. Rep. of Germany

[21] Appl. No.: 9,595

[22] Filed: Feb. 5, 1979

[51] Int. Cl.³ .............................................. B05C 1/08
[52] U.S. Cl. .................................... 156/450; 118/221;
118/223; 118/224; 118/235; 118/239; 118/245;
118/255; 156/455; 156/540; 156/547; 156/552;
156/562; 156/578; 427/177; 427/208.8;
428/354
[58] Field of Search ............... 156/540, 549, 552, 560,
156/562, 569, 570, 446, 450, 455, 459, 547, 559,
578; 427/207 D, 177–179; 428/40, 215, 261,
343, 354; 118/221, 223, 224, 235, 239, 244, 245,
255

[56] References Cited

U.S. PATENT DOCUMENTS

| 2,652,351 | 9/1953 | Gerhardt ..................... 427/207 D X |
| 3,051,222 | 8/1962 | Rueckert ........................... 156/549 X |
| 3,464,842 | 9/1969 | Jackstadt .......................... 428/343 X |
| 3,598,679 | 10/1971 | Ettre et al. ....................... 156/540 X |
| 4,035,218 | 7/1977 | Yount .......................... 427/207 D X |
| 4,112,177 | 9/1978 | Salditt et al. ................ 427/207 D X |
| 4,145,465 | 3/1979 | Sanderson et al. ................ 428/40 X |

Primary Examiner—Bruce H. Hess
Attorney, Agent, or Firm—Toren, McGeady and Stanger

[57] ABSTRACT

A laminate composed of a web of carrier material and a thick layer of contact adhesive thereon wherein the thick layer is composed of a series of thin layers of contact adhesive which are bonded together. Methods and apparatuses are disclosed for preparing the laminate. Using such methods and apparatuses, thick layers of contact adhesive may be simply and economically produced.

1 Claim, 3 Drawing Figures

METHOD AND ARRANGEMENT FOR THE PRODUCTION OF THICK LAYERS OF CONTACT ADHESIVE

BACKGROUND OF THE INVENTION

1. Field of The Invention

The invention relates to a method and an arrangement for the production of thick layers of contact adhesive, and particularly to dispersion or solvent-type adhesive systems, which include the so-called pressure sensetive adhesives and retaining adhesives.

2. Description of the Prior Art

Contact adhesives are used today in industry to an increasing extent. These contact adhesives can be applied on a carrier material or they can be used as a so-called "transferable adhesive film" without a carrier. Depending on the type of use of layers of such contact adhesives, it is sometimes necessary to have layer thicknesses in the order of magnitude of approximately 1 mm. Such thick layers pose problems particularly in the use of dispersion adhesives or solvent-type adhesives. Dispersion adhesives contain approximately 50% water while solvent-type adhesives contain approximately 70% solvent. In both cases, these solvents must be removed after application of the layer using a drying process. Accordingly, when such thick layers are to be produced, there are long drying periods and the danger of the bubble formation, thereby creating non-uniformities in the layer, is present.

SUMMARY OF THE INVENTION

It is an object of the present invention to produce thick layers of contact adhesives in a very simple manner.

According to the invention, this is accomplished by bonding together individually produced thin layers of contact adhesive in an appropriate number after the drying process. Using this method, the economical production of contact adhesive layers with a thickness of 0.1 to 0.2 mm poses minimal problems.

With such thin layers, the drying periods are very short and, yet, there is no danger of bubble formation. Therefore, it is especially advantageous to produce such thin layers individually and to bond them together after the drying process until the desired thickness of the layer is obtained.

In another embodiment for obtaining the desired layer thickness, several thin layers of contact adhesives are applied successively directly onto the desired surface, each layer being applied after the drying process of the previous layer has been concluded. Such a procedure has the advantage that the individual layers of contact adhesive need not be separated from its support surface for bonding. Instead, the layer is created directly on the support surface on which it is required.

In yet another embodiment of the present invention, individually produced layers of contact adhesive are applied onto a carrier material which has been treated on both sides with a release agent and the layers are rolled up for storage in the form of a web or sheeting. The desired thickness of layers is obtained by individually separating an appropriate number of layers from the carrier material and rolling them together. In this manner, it is possible to economically and continuously produce a layer of contact adhesive of the desired thickness. In this case, it is even possible to change the layer thickness on short notice by omitting or adding individual webs.

The present invention also comprises a machine for the production of thick layers of contact adhesive wherein a web of carrier material, with a layer of upwardly facing contact adhesive is guided, for example, from a roll, around a support surface and, in the region of the support surface, an appropriate number of additional webs of carrier material, with the layer of contact adhesive facing downwardly, are successively bonded to the contact adhesive layer of the first web by means of contact rollers or the like. The carrier material is separated from the adhesive layer and is separately returned after passing the corresponding contact roller. Such a machine can operate continuously until the individual rolled webs are used up, and the desired thickness of the adhesive layer can be varied within a wide range by adding or omitting individual webs.

In another arrangement for the production of thick layers of contact adhesive in accordance with the present invention, endless belts, the outside of which are treated with a release agent, are used. The belts travel from a first to a second roller arranged in such a manner that the adhesive layers applied onto the belt are successively brought together in the region of the second roller, are bonded together and separated from the roller of the preceding belt. The number of belts used depends on the number of layers to be bonded together. The thick layer of contact adhesive obtained in this manner is wound onto, for example, a roller with the intermediate arrangement of a carrier material which is treated on both sides with a release agent.

Such an arrangement is particularly suited for the continuous production of a thick layer of contact adhesive, since the individual thin layers of contact adhesive are each continuously produced on the individual endless belts, and since the time delay between the application of the layer and the separation for bonding to the next layer is utilized for the drying process.

DESCRIPTION OF THE PREFERRED EMBODIMENTS

Figure 1:
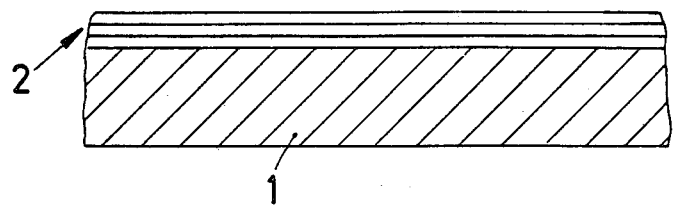
FIG. 1 shows a cross-section through a carrier material with several layers of contact adhesive arranged one on top of another.

Referring to FIG. 1, a section through a carrier material 1 is shown onto which there are successively applied several contact adhesive layers 2 until the desired thickness is reached. In this case, after the application of each layer, a drying period is required since the contact adhesives contain either a solvent or water which must be evaporated before the next layer is applied. The individual adhesive layers can be so thin that this drying process takes place quickly and without the formation of bubbles. Contact adhesive layers with a thickness in the order of magnitude of 1 mm are required, for example, in lieu of palets, for fastening workpieces in semi-automatic or fully automatic working or production lines. Contact adhesive layers are able to fix workpieces of various sizes and dimensions in a predetermined position without causing damage to the workpiece or the contact adhesive layer during a later separation.

Figure 2:
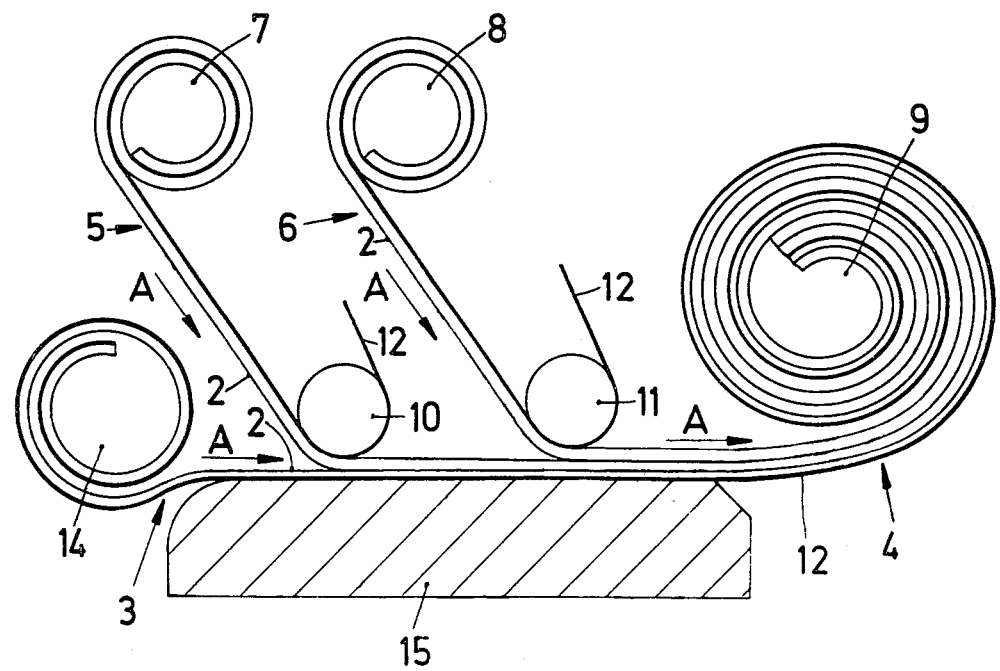
FIG. 2 shows an arrangement for bonding together several thin layers of contact adhesive, each layer being taken from individual rollers.

FIG. 2 shows an arrangement for the production of a thick layer of contact adhesive, consisting of three webs 3, 5 and 6 of a carrier material 12 treated on both sides with a release agent, with an adhesive layer 2 applied on one side. Coming from a roller 14, the web 3 with the adhesive layer 2 facing upwardly, is guided in accordance with arrow A along a supporting surface 15 and is subsequently wound into the roll 9.

In the region of the supporting surface 15, the webs 5 and 6 coming from the rollers 7 and 8 are delivered, with the adhesive layer 2 facing downwardly, to the web 3 and the contact rollers 10 and 11 effect a bonding of the adhesive layers.

The carrier material 12 of each web 5 and 6 is separated from the corresponding adhesive layer after passing the contact surface and is returned separately. In this case, webs 5 and 6 also move in the direction of the arrows A. In accordance with the numbers of webs 5 and 6, web 4 leaves the supporting surface 15 with an adhesive layer of appropriate thickness and is rolled up in rolls 9 for storage. The carrier material 12 for webs 3, 4, 5 and 6 may principally be the same, i.e each must be treated on both sides with a release agent since the adhesive layer 2 must again be separated from the webs 5 and 6 during the bonding process and the web 3 or 4, after rolling up, must also again be unrolled.

The production of rolls 14, 7 and 8, each with a thin layer 2 of contact adhesives, poses no problems, since in the application of such a thin layer in the order of magnitude of 0.1 to 0.2 mm, the solvent or water still contained in the liquid adhesive can be easily removed in a drying process. Depending on the thickness of the desired adhesive layer, an appropriate number of rolls 7 or 8 and corresponding contact rollers are provided.

Figure 3:
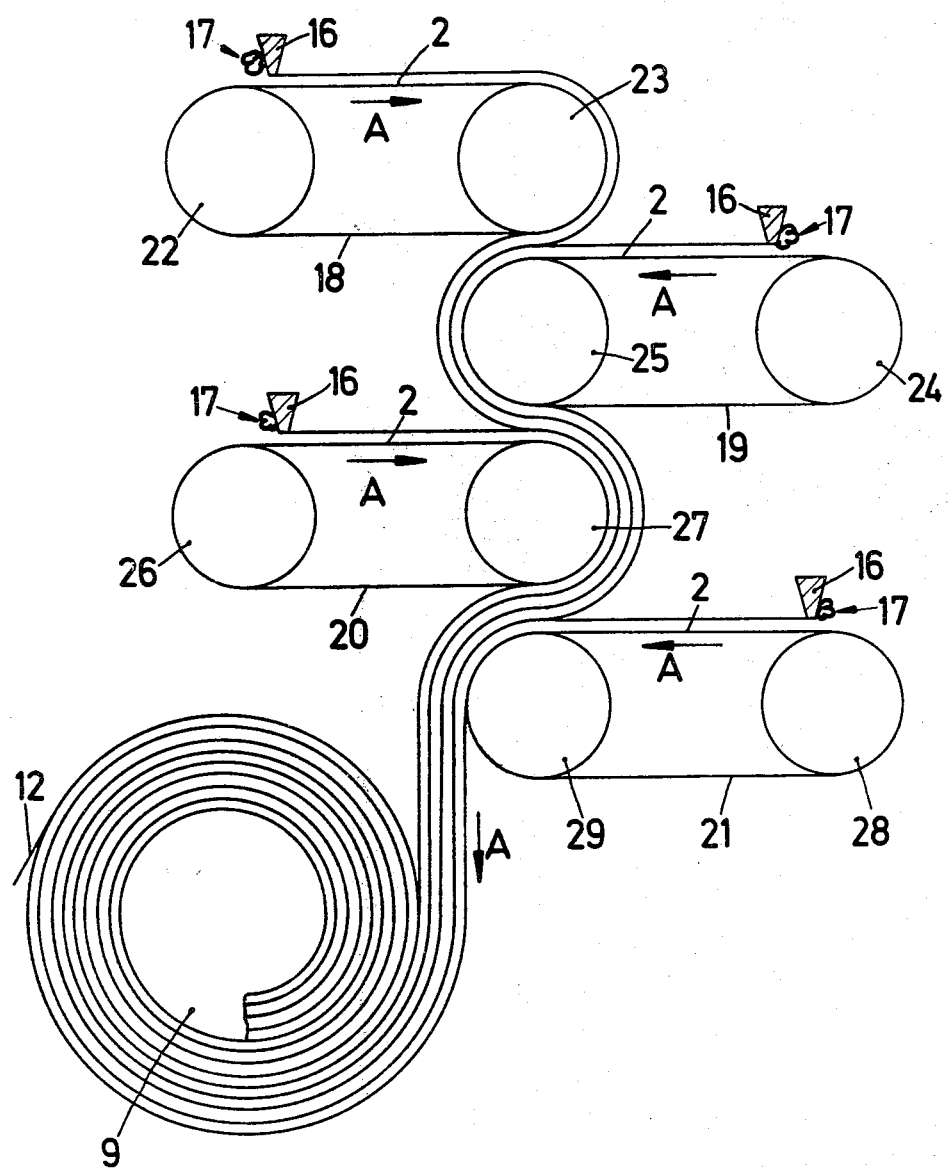
FIG. 3 shows an arrangement for the successive production of several thin layers of contact adhesive on endless belts and the combination of the individual layers to a thick layer.

FIG. 3 shows an arrangement for the continuous production of a thick layer of contact adhesive. In accordance with the number of desired thin adhesive layers 2 for obtaining a thick layer, endless belts 18, 19, 20, 21 which are treated with a release agent on at least the outside thereof are provided. These belts travel from a first roller 22, 24, 26 and 28 to second rollers 23, 25, 27 and 29, respectively and are arranged in such a manner that the adhesive layers 2 applied onto the individual belts can be successively brought together, bonded together and wound onto a roll 9.

Each of the individual belts move in the direction of the arrows A and convey the adhesive material 17 applied in the region of the first roller toward each corresponding second roller, the thickness of the adhesive material 17 being defined by a stripper edge 16. During the time the material is conveyed from the first to the second roller, a drying process for the adhesive layer can be provided.

Starting from belt 18, the adhesive layer 2 travels partially around the second roller 23 after the drying process and is bonded to the adhesive layer 2 of the belt 19 at this location. This belt 19 also travels from a first roller 24 toward a second roller 25 in the direction of arrow A. It must be ensured at this point that the adhesive layer which is now twice as thick is separated from the belt 18 which has been treated with a release agent and that it follows roller 25 for an angle of about 180°.

Subsequently, this adhesive layer, which is now twice as thick, meets the adhesive layer of the belt 20 and is then three times as thick as the individual adhesive layers 2.

Additionally, each endless belt, except for the last, may be equipped with deflection and contact roller means to deflect the coating from the belt and contact the deflected coating with the thin coating on the next belt.

The same procedure is repeated by meeting the belt 21 and, thus, an adhesive layer is obtained which is four times as thick. This adhesive layer leaves the roller 29 in order to be wound into a roll 9 for storage. A carrier material 12 which had been treated on both sides with a release agent is also wound into this roll in order to prevent the rolled-up webs from sticking together.

In accordance with the desired thickness of the adhesive layer, it is possible to either provide an appropriate number of belts, or to bring together in an arrangement according to FIG. 2, several adhesive layers having two or three times the original thickness. In any case, an arrangement according to FIG. 3 allows the continuous production of contact adhesive with a very economical use of carrier material 12 which is treated on both sides with a release agent.

What is claimed is:

1. Arrangement for the production of composite contact adhesive material which, on a web of carrier material, carries a plurality of layers of the contact adhesive material which layers are bonded directly together, characterized in that a plurality of endless belts which are treated with a release agent on their outer surface are provided, said endless belts each extending to a deflection roller from a coating station, in which a layer of the contact adhesive material is applied and dried on said outer surface, that said deflection rollers of said endless belts are arranged next to each other with parallel axes and press said contact adhesive material layer delivered through the respectively assigned endless belt against the composite layer which is supplied by the preceding endless belt seen in conveying direction of said composite layer and separate said composite layer reinforced in this manner from the preceding endless belt, whereby the endless belt delivers the separated composite layer to the deflection roller of the next endless belt seen in conveying direction of said composite layer, and that a winding device rolls up said composite layer together with said web of carrier material.

* * * * *